US007778406B2

(12) United States Patent
Erb (10) Patent No.: US 7,778,406 B2
(45) Date of Patent: Aug. 17, 2010

(54) E-911 MANAGED CALL ROUTING

(75) Inventor: Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1149 days.

(21) Appl. No.: 11/380,034

(22) Filed: Apr. 25, 2006

(65) Prior Publication Data

US 2006/0239418 A1   Oct. 26, 2006

(30) Foreign Application Priority Data

Apr. 26, 2005   (EP)   ................................ 05103398

(51) Int. Cl.
*H04M 3/00*   (2006.01)
(52) U.S. Cl. .................. 379/272; 45/142.07; 45/221.01; 45/221.14; 45/273
(58) Field of Classification Search ............ 379/45, 379/221.01, 221.14, 272, 273, 142.07
See application file for complete search history.

(56) References Cited

U.S. PATENT DOCUMENTS

| 5,488,655 A * | 1/1996 | Hamlen ................. 379/114.06 |
| 6,212,260 B1 * | 4/2001 | Baum et al. .................... 379/38 |
| 7,384,300 B1 * | 6/2008 | Salgado et al. ............... 439/489 |

| 2002/0136359 A1 | 9/2002 | Stumer et al. |
| 2003/0063714 A1 | 4/2003 | Stumer et al. |
| 2005/0047574 A1 * | 3/2005 | Reid ..................... 379/211.01 |

FOREIGN PATENT DOCUMENTS

EP   05103398.3-2414   4/2005

OTHER PUBLICATIONS

National Emergency Number Association, "Model Legislation, Enhanced 9-1-1 for Multi-line Telephone Systems" NENE Technical Information Document, Nov. 2000, XP002227690.

* cited by examiner

*Primary Examiner*—Melur Ramakrishnaiah
*Assistant Examiner*—Yosef K Laekemariam (57) ABSTRACT

A method and system of local call detection and notification are provided for a communication device that communicates with an enterprise system via a secure digital voice connection and locally with the Public Switched telephone system (PSTN) via an analog line. A dialing sequence at said communication device is detected within the enterprise system for which local call routing is to be applied. Call routing is then initiated through the enterprise system and a request message is sent to the communication device that includes the dialing sequence. The request message is received within the communication device, which in response determines availability of the analog line. In the event an analog line is available the communication device sends a response message to the enterprise system for aborting call routing through the enterprise system, and locally dials said the sequence over the analog line. In the event an analog line is not available call routing continues through the enterprise system.

12 Claims, 5 Drawing Sheets

E-911 MANAGED CALL ROUTING

CROSS-REFERENCE TO RELATED APPLICATION

This application claims priority to European patent application number 05103398.3 filed on 26 Apr. 2005, titled E-911 Managed Call Routing, the entire disclosure of which in incorporated herein for any and all purposes.

BACKGROUND OF THE INVENTION

1. Field of the Invention

The present invention relates generally to telephone systems, and more particularly to a method of local emergency call detection and notification for telephone sets that communicate with a remote telephone system via an analog line interface module (LIM).

2. Description of the Related Art

Recent advances in communications technology have supported an increase in the number of enterprise employees and contractors who work away from the geographical location of the enterprise (e.g. in a Small-Office/Home-Office (SOHO)). In such circumstances, a teleworker may utilize a telephone that incorporates a selectable analog line interface module (LIM) for connection to a local central office (CO) or alternatively may communicate with the enterprise (e.g. Integrated Communications Platform (ICP)) via a secure digital voice connection (i.e. VoIP). Thus, the LIM device is capable of providing local E-911 call routing to the connected CO. Local E-911 call routing can be initiated by lifting the handset and selecting the analog line (possibly selected by default), in response to which dial tone is provided by the CO and the user is permitted to dial 911.

Support of Emergency Services requires an Emergency Location Identification Number (ELIN) number to be sent to a Public Safety Answering Point (PSAP) when an emergency service number (e.g. 911) is dialed. The TIA standard prescribes al 10-digit number that is inserted in the source address field on E911 trunk calls. The PSAP uses the ELIN to direct emergency personnel to the location of the call. The ELIN acts as an index into the civic location database maintained at the PSAP, which in turn contains the real callback number, street address, in-building coordinates, etc. of the caller.

Thus, when a caller dials 911, a call is made to the PSAP office, and information regarding the phone's location is sent to the PSAP to allow emergency response professionals to locate the individual making the call. The location information is represented by the 10 digit ELIN number.

When the user has not selected the analog line to make an E-911 call and the attached telephone set is connected to the enterprise, call processing within the ICP handles the E-911 call using existing system E-911 call routing. However, the enterprise ICP system may be located in a different PSAP coverage area than the telephone set, or the PSAP may not have accurate location information for the telephone set. In either of these cases, routing an emergency call through the enterprise system may result in a delayed or misdirected emergency response.

As indicated above, local E-911 call routing can be initiated by lifting the handset and selecting the analog line. However, the user may not remember to select the analog line during an emergency. Also, someone who is not familiar with the need to first select the analog line may dial the emergency call.

SUMMARY OF THE INVENTION

According to the present invention, a method of local emergency call detection and notification is provided for telephone sets that communicate with a remote telephone system (e.g. ICP) or locally via an analog line interface module (LIM). Upon system detection of an E-911 call, set functionality routes the call through existing system E-911 call routing or through local E-911 routing on the LIM analog line, depending on line availability and user preference. Accordingly, the method of the present invention provides support for local E-911 call routing without user intervention, while allowing system E-911 notification and associated system functionality to react to the E-911 call even when local E-911 call routing is applied. The method of the invention can also be extended to handle other dialing sequences that would be configured to follow local call routing through the analog line rather than system call routing, for geographic distribution and/or toll bypass, as discussed in greater detail below.

According to an embodiment of the invention, the telephone set is configured to recognize that a user has dialed an emergency call and automatically apply local E-911 call routing. Safeguards are also provided to prevent false detection of an E-911 call (e.g. when digits that match the E-911 dialing string are part of an IVR dialing sequence).

Upon detection of an E-911 call by the system, a message is sent by the enterprise system (ICP) to the set indicating that an E-911 call is being initiated. The message is sent to the set in addition to providing existing E-911 support. The message is used by the set to provide E-911 call indication as well as the associated dialed digits for the emergency call.

The telephone set, on receipt of the message, determines whether an analog line is available (e.g. the set firmware uses the analog LIM which detects presence or absence of line voltage, where presence of line voltage indicates an idle line while absence of voltage indicates line busy or disconnected)). If the line is available, the telephone set aborts the system E-911 call routing (possibly by providing a hang-up indication before the call is delivered to the PSAP) and initiates local E-911 call routing. If an analog line is not available, the message is not acted upon and/or rejected, such that system E-911 call handling continues. Alternatively, the telephone set may provide a response message indicating result and/or error conditions.

BRIEF DESCRIPTION OF THE DRAWING

A detailed description of the preferred embodiment is provided herein below, with reference to the following drawings in which.

DETAILED DESCRIPTION OF THE PREFERRED EMBODIMENTS

Figure 1:
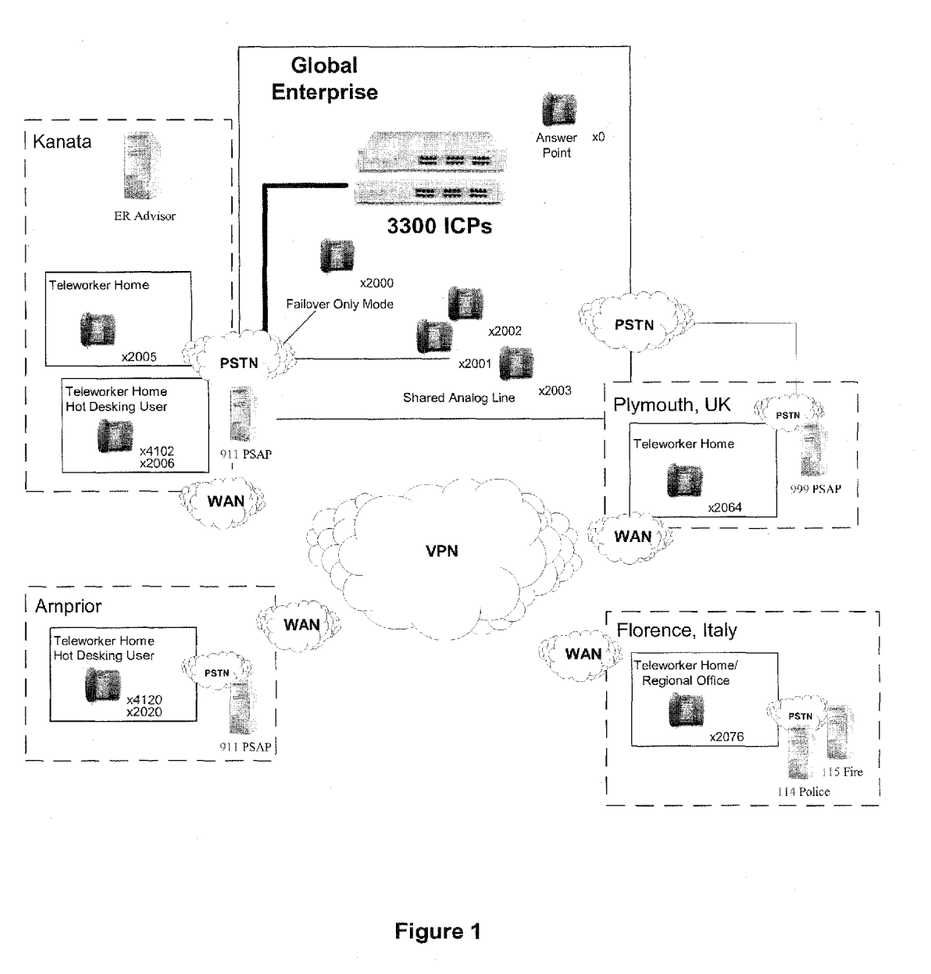
FIG. 1 is a block diagram of an exemplary global enterprise system (ICP) with several satellite offices and connected teleworkers, forming the operating environment for the method according to the present invention.

FIG. 1 depicts a communications network environment spread over a large geographical area. One or more enterprise ICPs (such as the MN3000 Integrated Communications Platform (ICP) manufactured by Mitel Networks Inc.) provide traditional PBX functionality along with advanced features to a plurality of centrally-located telephones (e.g. extension X2000 and answer point X0), some of which may by digital telephone sets. However, for the purposes of the present invention, discussion is limited to sets configured with an analog LIM. As shown in FIG. 1, some of the telephones may share an analog line (e.g. X2001, 2002, etc.).

As is common in the art, teleworkers may also have connections to the enterprise ICP via a Virtual Private Network (VPN) over a Wide Area Network (WAN). However, as discussed above, these users are also connected locally to the Public Switched telephone system (PSTN). For example, in FIG. 1, an ER Advisor and teleworkers in Kanata (e.g. at extensions X2005, X2006 and X4102 (via Hot-Desking)) are connected to the enterprise ICP via a WAN but may also connect to a 911 PSAP over the PSTN. In this case, the PSAP happens to be located in the same PSAP coverage area as the enterprise ICP. A teleworker in Arnprior (e.g. at extension X2020 and X4120 via Hot-Desking)) is connected to the enterprise ICP via the WAN but locally over the PSTN to a 911 PSAP in a different coverage area as than the enterprise ICP. The user in Plymouth (e.g. extension X2064) is connected to the enterprise ICP via the WAN but locally over the PSTN to a PSAP in a different coverage area than the enterprise ICP and also having a different emergency dialing string (e.g. 999). Finally, in the exemplary embodiment of FIG. 1, a teleworker in Florence is connected to the enterprise ICP via the WAN but locally over the PSTN to PSAPs in a different coverage area than the enterprise ICP and having multiple different emergency dialing strings (e.g. 114 Police, 115 Fire).

In FIG. 1, the telephone at extension X2000 is indicated as being configured with a Failover Only Mode. This allows selection of the analog line by a user only when the telephone set is not registered with an ICP, thereby functioning as a fail guard in the event of network or ICP failure. According to the present invention, the emergency call routing option overrides the Failover Only Mode setting such that when configured for Analog Line First (or Analog Line Only) the emergency call always uses the attached LIM.

LIM attached telephone sets may be configured within the enterprise to select a shared analog line within the enterprise (e.g. X2001, X2002, etc.), in the event of network or ICP failure and/or for special call handling. For these telephones, system-only emergency call handling is appropriate.

As with the shared analog ling configuration above, LIM E911 inter-working is not appropriate for a LIM attached telephone set configured as an answer point extension (e.g. X0). However, since system emergency call routing may restrict some telephone sets from routing to specific PSAP destinations (Toll denial—route digits), as appropriate, the answer point extension may therefore be configured to intercept these calls and make an emergency call on behalf of a restricted telephone set. The answer point telephone set is configured so as not to automatically use local emergency call routing, but instead be allowed to use any emergency dialing string without restriction.

A LIM attached telephone set installed at a residence within the same PSAP coverage area as the enterprise (e.g. extensions X2005, X2006 and X4102 (via Hot-Desking)), allows use of the home phone line as well as teleworker functionality. In this case, the ELIN (referred to within the enterprise as CESID (Customer Emergency Services Identification)) information configured for the telephone set includes the home address. Both system emergency call routing and local emergency call routing result in connection to the same PSAP for emergency dispatch. While LIM E911 inter-working affects which ELIN data (home or CESID) is used by the PSAP, there is effectively no difference. Accordingly, emergency call processing is preferably routed locally over the analog line and PSTN for such users.

When Hot Desking is used to allow the user to share a common extension number and profile (for example, between a teleworker set (e.g. X4120) and a telephone set in the enterprise office), consistent configuration of the analog line selection key is important. An emergency call originated by a Hot Desk user reflects the CESID and E911 LIM configuration of the physical telephone set. In such situations, the analog line is selected first.

Similarly, a LIM attached telephone set installed at a residence in a different PSAP coverage area (e.g. X2020) allows use of the home phone line as well as teleworker functionality in a different city (or geographic region). In this scenario the emergency dialing string is the same for both PSAPs (i.e. 911). Again the CESID information configured for the telephone set includes the home address. However, system emergency call routing and local emergency call routing would result in connections to different PSAPs for emergency dispatch. The call is therefore prevented in such situations from being connected to the PSAP providing system E911 emergency dispatch to the enterprise and instead proceeds to the local PSAP for handling, or an appropriate destination within that PSAP coverage region.

For a LIM attached telephone set installed in a different country or geographic region (e.g. extension X2064), the emergency dialing string may be different between the system PSAP and the local telephone set PSAP (i.e. the difference between 911 and 999). In this situation, the analog line is used to make the emergency call to the local PSAP, and the emergency dialing string for the local PSAP is configured in the system ICP to recognize an emergency call dialed at the telephone set. The system then sends a dial request message to initiate the local emergency call using the analog line, as discussed in greater detail below.

A LIM attached telephone set may also be installed at a residence in a different PSAP coverage area (e.g. extension X2076) where there are multiple different emergency dialing strings which are also different between the system PSAP and the local telephone set PSAPs (i.e. 911, 114, and 115). In this situation, the analog line is used to make the emergency call to the local PSAP, and emergency dialing strings for each different PSAP are also configured in the system to recognize each possible emergency dialing string available at the telephone set.

According to the present invention, for those telephone sets that may be connected both to the enterprise system ICP and a PSAP in a different coverage area, both the telephone set and the system ICP are configured to recognize an emergency call dialed by the user. Thus, for the teleworkers in Arnprior, Plymouth, Florence, etc. of FIG. 1, either system E-911 call routing is applied or, if the set is so configured and an analog line is available, local E-911 call routing is applied. Configuration of the emergency number in the telephone set may be accomplished, if desired, in the firmware or in the system database and provided to the telephone set on registration.

Upon detection of an E-911 call by the system, a message (Analog Line Dial Request) is sent to the telephone set indicating an E-911 call is in the process of being established. This message is sent in addition to providing existing E-911 system support. The existing system emergency call routing does not proceed until a response (Analog Line Dial Response) is received from the telephone set (or a time-out occurs), to ensure an emergency dial-out never results in two emergency calls placed to different PSAPs.

The Analog Line Dial Request message indicates to the telephone set that an E-911 call has been detected (in progress) and also includes the digits dialed up to the point of detection. The system (ICP) must be configured with the complete emergency dialing string for the telephone set to dial in order to prevent predictive dialing of an emergency call.

The telephone set, on receipt of the message, determines whether an analog line is available by communicating with the analog Line Interface Module (LIM), as indicated above, to determine the state of the analog line. If the analog line is available (i.e. line voltage is detected), the telephone set firmware sends the Analog Line Dial Response message indicating the overall result of dialing proceeding (e.g. digits being dialed on the analog line even when error conditions are reported by the telephone set). The telephone set firmware then transitions into Analog Call Mode (seizing the analog line, waiting for dial tone from the PSTN Central Office (CO)). The handling of various call scenarios during the transition into Analog Call Mode is well known in the prior art.

Following a delay for receipt of CO dial tone, the digit string provided in the Analog Line Dial Request is dialed on the analog line (providing DTMF tone) and presented to the user on the telephone set display (as dialed). The system provides local emergency notification support and proceeds to clear down the call.

As identified above, the system does not proceed with emergency call routing until the Analog Line Dial Response message is received from the telephone set. This may give rise to a timing issue should the user hang up on the emergency call after the system detects the emergency call and before the telephone set switches to analog line mode. To address this occurrence, when the system receives the hang up indication, the Analog Line Dial Request message is sent to the telephone set with a dial mode of abort dialing.

Figure 2:
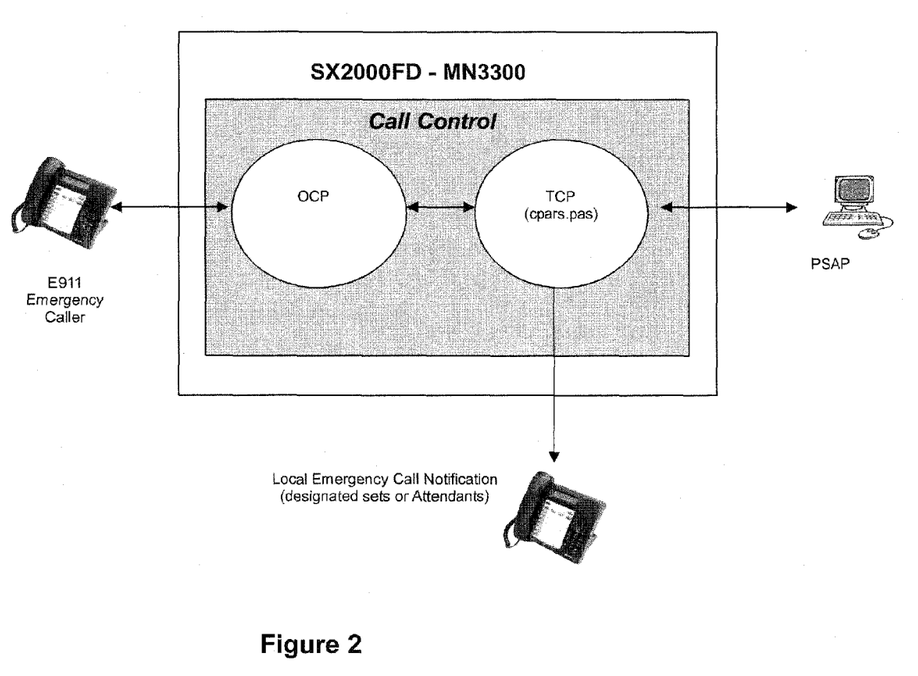
FIG. 2 is a schematic representation of emergency call notification progression within the enterprise ICP, according to the prior art.

Before turning to a detailed discussion of the message exchange between the telephone set and ICP to enable local E911 dialing, a brief discussion is provided of the enterprise ICP handling of emergency calls with reference to FIG. 2.

The existing notification mechanism in Call Control for Emergency Calls (E911) is initiated after the number has been translated and the route has been determined to be accessing a trunk that has been programmed for emergency use. For the exemplary embodiment of an MN3300/SX2000FD ICP, this is effected by entering an "E" for the "Route Type" in the Customer Data Entry (CDE) "Route Assignment" form. The detection of the emergency call is made in a program cpars-.pas.

When the emergency call is detected, a call is made to the PSAP, including the CESID information. If the Call Control has a local emergency response notification feature enabled and devices are programmed to receive this notification, then local notification is also provided. Notification in this context is not a call, but strictly a visual and audio indication that an Emergency Call has been made.

For local emergency call handling according to the present invention, detection continues to be based on the configuration of the emergency route type, however the check is done earlier in the progress of the call. This is required to send the Analog Line Dial Request notification to the telephone set and to prevent the trunk from being seized.

Figure 3:
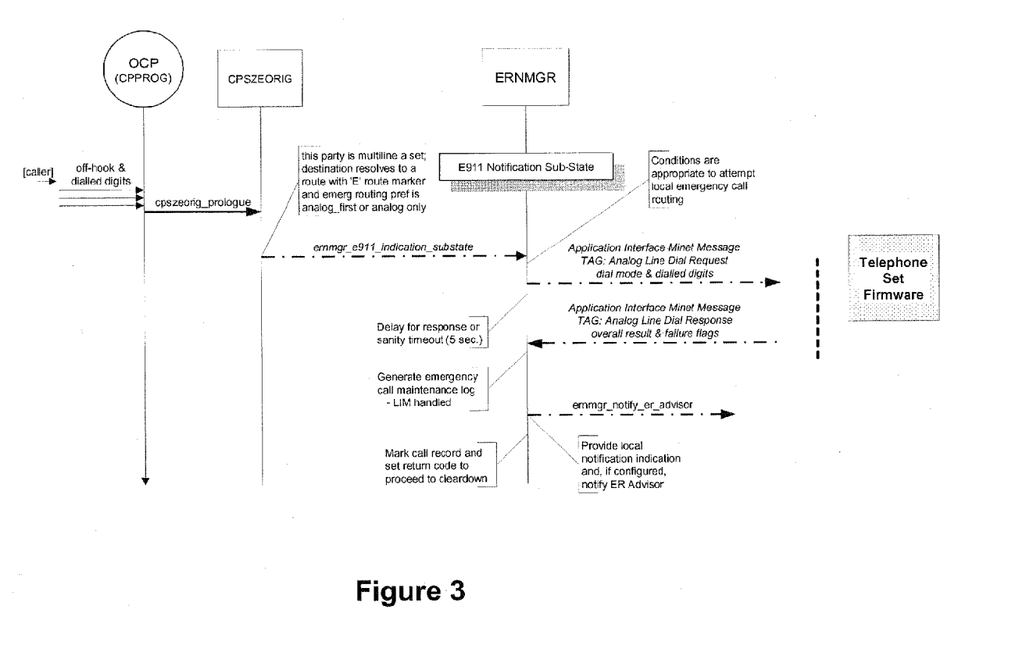
FIG. 3 is a message flow diagram showing a successful local emergency call routing according to the preferred embodiment.

As shown in FIG. 3, according to the present invention, a new sub-state (ERNMGR\ernmgr_e911_indication_substate) is introduced into the Call Control to manage LIM E911 inter-working. The CPSZEORIG function in Call Control checks for an emergency call after determining the appropriate terminator destination route from dialed digits when the caller is a multiline set.

Thus, for a multiline set, the Originating Call Process (OCP) in Call Control sends an originating call message (szeorig_prologue) to the CPSZEORIG routine in response to a caller going off-hook and dialing digits. Upon detection of an emergency call, with an 'E' route marker, the CPSZEORIG routine determines the analog emergency call routing preference and sends a message (enmgr_e911_indication_substate) to the ERNMGR sub-state. If the preference is not "system only" the ERNMGR sub-state is invoked. This sub-state is responsible for determining whether LIM handling should be attempted, and in response sends the Analog Line Dial Request message to the LIM attached telephone set, and waits for the response from the telephone set (or times out). Upon receipt of the response (Analog Line Dial Response), confirming that the call is to be LIM-handled (system emergency call routing is blocked), the ERNMGR generates an emergency call maintenance log, provides local notification, notifies the ER Advisor, and initiates transition to clear down the call. When the call is not LIM-handled and system emergency call routing is appropriate ERNMGR proceeds with normal emergency call handling.

As would be well known to a person of ordinary skill in the art, routines are provided for encapsulating the sending and receiving of the Analog Line Dial Request and Analog Line Dial Response (labeled Tag16#06 and Tag16#86 in a successful implementation of the invention). The format of each message is 20 bytes in the successful embodiment and the overall content is as follows:

```
For TAG = 0x06 (Analog Line Dial Request) the DATA bytes are formatted as follows:
    DataLen:    1 byte, number of bytes to follow
    DialMode:   1 byte, dialing mode, set by ICP: impacted by decision to block call
                0 - reserved
                1 - dial always: dial regardless of analog line availability or on/off
        hook
                2 - dial conditional: if analog line is available and off hook then dial
                3 - cancel dialing: after digits are dialed send a hang up to cancel call
    StringLen:  1 byte, number of bytes in the phone number to dial on the analog line
    DialString: n bytes, ascii digits to dial, 0–9 only
For TAG = 0x86 (Analog Line Dial Response) the DATA bytes are formatted as follows:
```

-continued

| | |
|---|---|
| DataLen: | 1 byte, number of bytes to follow (=2) |
| Result: | 1 byte, the result byte corresponding to the Analog Line Dial Request, formatted as follows (B7 is the most-significant bit): |
| | B0 = Exception - 1 indicates hardware not installed |
| | B1 = Exception - 1 indicates hardware not configured |
| | B2 = Exception - 1 Indicates phone on hook |
| | B3 = Exception - 1 indicates analog line in use |
| | B4 = Exception - 1 indicates invalid digits to dial |
| | B5 = unused |
| | B6 = unused |
| | B7 = Overall Result - 0 indicates digits dialed on analog line, 1 indicates request ignored |
| Reserved: | 1 byte, reserved for more result codes |

Figure 4:
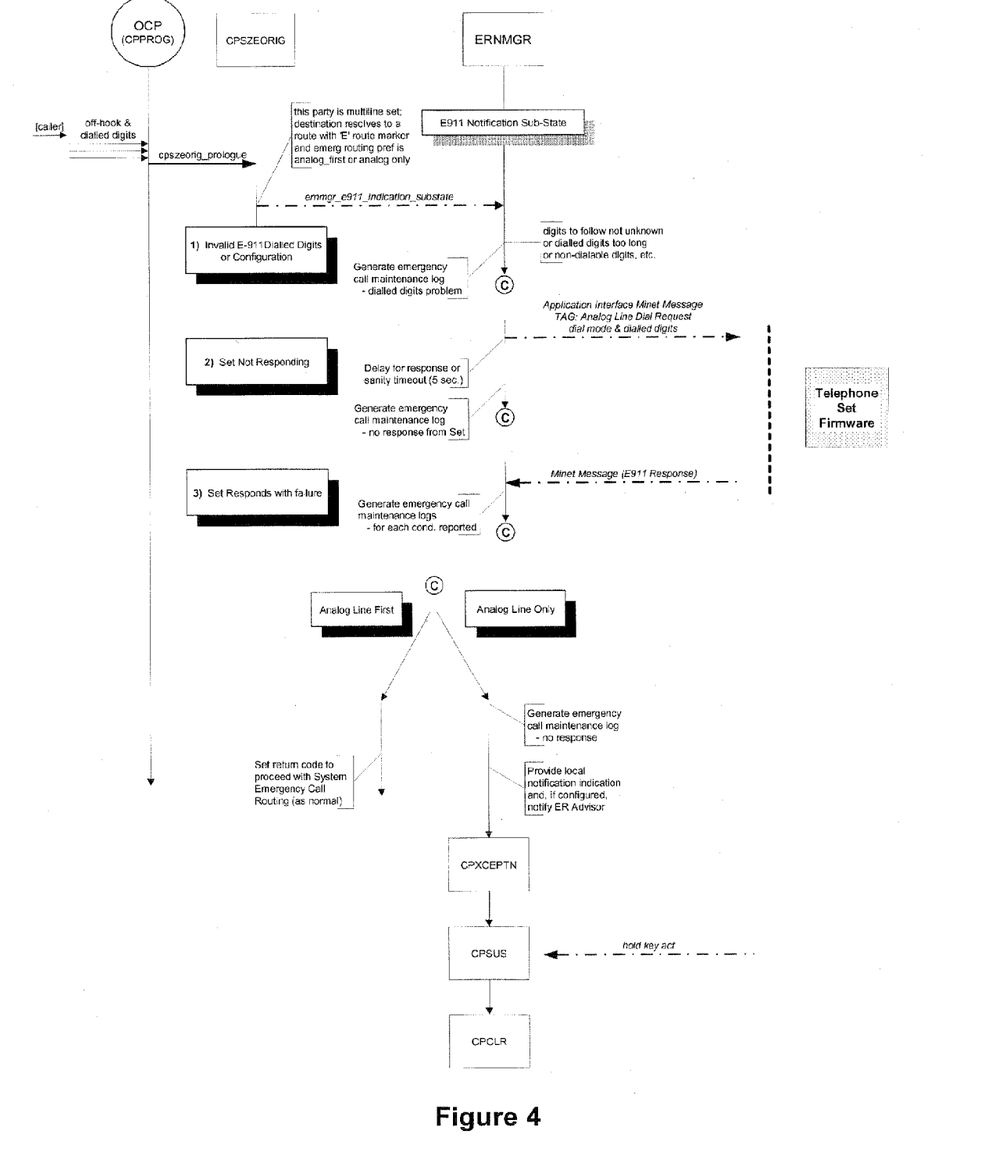
FIG. 4 is a message flow diagram showing a failed local emergency call routing according to the preferred embodiment.

In FIG. 4, message flow is depicted for a failed emergency call. In the event that the emmgr_e911_indication_substate message contains invalid 911 dialled digits or configuration (e.g. dialed digits too long, non-dialable digits, etc.), ENMGR either returns code to proceed with system Emergency Call Routing (for an Analog Line First configuration) or, for Analog Line Only configuration, the CPXCEPTN module applies busy tone and sets call state in the call record to 'waiting for analog line' (to modify the usual behaviour of CPSUS state). CPXCEPTN also displays the messages "LIFT HANDSET" and "SELECT ANALOG LINE". The state CPSUS then sets a timeout duration of 30 seconds and does not change the telephone set display. After 30 seconds, a timeout exception is applied. Alternatively, the message "NO ANALOG LINE" may be displayed, if the LIM is not installed or configured.

If the telephone set does not respond to the Analog Line Dial Request message within the prescribed timeout period (e.g. 5 seconds), an emergency call maintenance log is generated to indicate 'no response'. The ENMGR then either returns code to proceed with system Emergency Call Routing for an Analog Line First configuration or, for Analog Line Only configuration, the CPXCEPTN module applies busy tone and sets call state in the call record to 'waiting for analog line' (to modify the usual behaviour of CPSUS state). CPXCEPTN also displays the messages "LIFT HANDSET" and "SELECT ANALOG LINE". The state CPSUS then sets a timeout duration of 30 seconds and does not change the telephone set display. After 30 seconds, a timeout exception is applied. Alternatively, the message "NO ANALOG LINE" may be displayed, if the LIM is not installed or configured.

If the telephone set responds with a failure indicated in the Analog Line Dial Response message, then an emergency call maintenance log is generated for each failure condition reported. The ENMGR then either returns code to proceed with system Emergency Call Routing for an Analog Line First configuration or, for Analog Line Only configuration, the CPXCEPTN module applies busy tone and sets call state in the call record to 'waiting for analog line' (to modify the usual behaviour of CPSUS state). CPXCEPTN also displays the messages "LIFT HANDSET" and "SELECT ANALOG LINE". The state CPSUS then sets a timeout duration of 30 seconds and does not change the telephone set display. After 30 seconds, a timeout exception is applied. Alternatively, the message "NO ANALOG LINE" may be displayed, if the failure identifies a LIM is not installed or configured.

Figure 5:
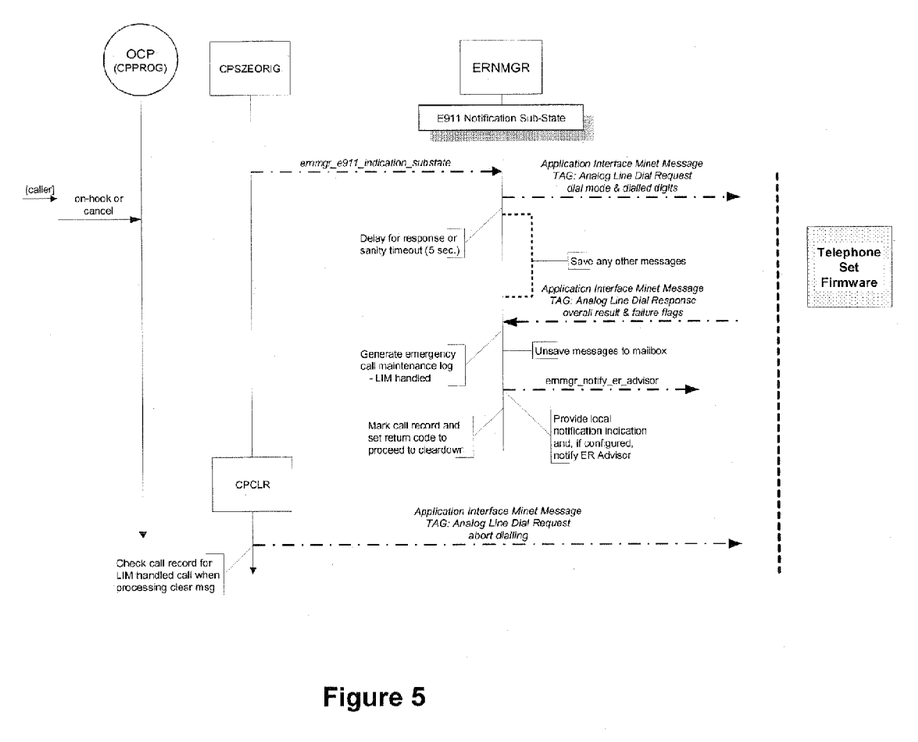
FIG. 5 is a message flow diagram showing a user-aborted local emergency call routing according to the preferred embodiment.

In FIG. 5, the caller goes on-hook or cancels the emergency call before it has been completed. The call routing is processed as discussed above in connection with FIG. 3, except that ERNMGR sends a further Analog Line Dial Request message to the telephone set upon receiving a 'clear' message from the caller, for aborting local dialing. Emergency call maintenance logs are generated to indicate a user abort, and the return code is set as proceed to cleardown. Alternatively, the hang up is logged (absorbed) and the emergency call proceeds normally (when the LIM is capable of on-hook dialling using the analog line). This prevents an assailant from hanging up on an emergency call that is in the process of being dialled on the analog line.

The primary application set forth herein is the accurate provision of E911 services. However, a person skilled in the art will also appreciate that the present invention can be applied whenever a call can be routed both by the system (ICP) and locally by a set (or other device that provides call routing capability, such as a SIP Enabled PC). This is particularly valuable for toll bypass when a telephone set is geographically separated from the system. For example, when a telephone set in Ottawa, Canada is registered with a system in London, UK any calls made on that set would be local to the UK office. However, local analog line access may be desired when calling for pizza delivery. Rather than requiring the user to lift the handset and select the analog line, the present invention allows the user to dial the local number directly and (subject to set/system configuration) the call is automatically routed through the local analog line rather than via the system. System configuration is required to distinguish between dialed digits that represent telephone numbers local to the telephone set (which are appropriate for analog line routing) and those that are appropriate for system routing. However, this can be accomplished by configuring the leading (local exchange). Recognition of specific numbers is not required although personal directory support may be utilized when available. Depending on dialing plan conflicts it may or may not be necessary for a user to dial special prefix digit(s), i.e. 8 for local calls, to distinguish between telephone numbers for system and local routing. Another example of toll bypass is the user in London UK dialing the number for the High Commission in Ottawa, Canada, including the long distance routing code. Rather than selecting a UK PSTN trunk and routing the call using long distance, the call is established between the caller and an available LIM analog line (i.e. handled within the system). An analog dial request message is sent to the LIM attached telephone set, including the High Commission dialing string local to Ottawa (i.e. the long distance routing digits are omitted). The caller is thereby connected locally in Ottawa via the VPN connection already established with the UK caller, thereby avoiding PSTN long distance charges.

Alternative embodiments are possible within the scope of the appended claims. For example, configuration of the set and the system, as well as analog line state information, can be utilized to determine whether the message should be sent to the set. Additional information can be sent by the system to the set (or from the set to the system) to modify how the decision is made on which call routing to apply. State information and events on the analog line can be exchanged between the telephone set and the system. This information can then be utilized to determine whether the analog line is idle (or can be forced idle) prior to proceeding with local emergency call routing. As indicated above, the Analog Line Dial Request message includes a byte that indicates the dial mode. This dial mode may be one of dial always, dial conditional, dial information, etc. which the telephone set firmware interprets as appropriate. For example, when 'dial conditional' is indicated the emergency call is only placed using the analog line when conditions are appropriate, while 'dial always' causes the emergency call to be attempted using the analog line even if the line is in use (i.e. breaking an the existing call), provided the LIM supports the capability to distinguish between 'line disconnected' and 'line in use' states.

Since numerous modifications and changes will readily occur to those skilled in the art, it is not desired to limit the invention to the exact construction and operation illustrated and described, and accordingly all suitable modifications and equivalents may be resorted to, falling within the scope of the invention.

Although the present invention has been described in considerable detail with reference to certain preferred versions thereof, other versions are possible. Therefore, the spirit and scope of the appended claims should not be limited to the description of the preferred versions contained herein.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. §112.

What is claimed is:

1. A method of local call detection and notification for a communication device that communicates with an enterprise system via a secure digital voice connection and locally with the Public Switched telephone system (PSTN) via an analog line, comprising:
    detecting within said enterprise system a dialing sequence at said communication device for which local call routing is to be applied and in response initiating call routing through said enterprise system and sending a request message to said communication device including said dialing sequence;
    receiving said request message within the communication device and in response the communication device determines availability of said analog line, and in the event said analog line is available sending a response message to said enterprise system for aborting said call routing through said enterprise system and the communication device locally dialing said sequence over said analog line; and
    in the event said analog line is not available continuing said call routing through said enterprise system.

2. The method of claim 1, further comprising providing emergency call routing within said enterprise system pending receipt of said response message in the event said dialing sequence is detected to be an emergency call.

3. The method of claim 1, further comprising the step of preventing completion of said call routing through said enterprise system pending one of either receipt of said response message or a predetermined timeout period.

4. The method of claim 1, wherein said step of determining availability of said analog line includes detecting presence of line voltage on said analog line.

5. The method of claim 1, further comprising the step of displaying said dialing sequence included in said request message at said communication device.

6. The method of claim 2, further comprising the step of generating an emergency call maintenance log within said enterprise system.

7. The method of claim 2, further comprising the step of notifying an ER advisor of said emergency call.

8. The method of any one of claims 1 to 7, wherein said communication device is a telephone set.

9. The method of any one of claims 1 to 7, wherein said communication device is a computer with telephony functions.

10. In call control for an enterprise system with which a communication device communicates via a secure digital voice connection, said communication device also communicating locally with the Public Switched telephone system (PSTN) via an analog line, the improvement comprising:
    an Originating Call Process (OCP) for generating an originating call message in response to a call causing said communication device to go off-hook and dialing a sequence of digits;
    a routing for determining an appropriate terminator destination route from said sequence digits in response to generation of said originating call message, and generating a further message for initiating call routing via said enterprise system; and
    a call control sub-state for
        receiving said further message and in response determining whether call routing should proceed via said analog line,
        sending a request message to said communication device which, in response the communication device determines availability of said analog line and in the event said analog line is available the communication device sends a response message to said enterprise system, and
        receiving said response message and in the event said response indicates analog line availability then aborting said call routing through said enterprise system, and in the event said response indicates unavailability of analog line then continuing said call routing through said enterprise system.

11. The improvement of claim 10, wherein said request message is of the format:

---

For TAG = 0x06 (Analog Line Dial Request) the DATA bytes are formatted as follows:
   DataLen:     1 byte, number of bytes to follow
   DialMode:   1 byte, dialing mode, set by ICP: impacted by decision to block call
                       0 - reserved
                       1 - dial always: dial regardless of analog line availability or on/off hook -continued

|  |  |
|---|---|
|  | 2 - dial conditional: if analog line is available and off hook then dial<br>3 - cancel dialing: after digits are dialed send a hang up to cancel call |
| StringLen: | 1 byte, number of bytes in the phone number to dial on the analog line |
| DialString: | n bytes, ascii digits to dial, 0–9 only. |

12. The improvement of claim 10, wherein said response message is of the format:

Ror TAG = 0x86 (Analog Line Dial Response) the DATA bytes are formatted as follows:
   DataLen: 1 byte, number of bytes to follow (=2)

-continued

|  |  |
|---|---|
| Result: | 1 byte, the result byte corresponding to the Analog Line Dial Request,<br>  formatted as follows (B7 is the most-significant bit):<br>  B0 = Exception - 1 indicates hardware not installed<br>  B1 = Exception - 1 indicates hardware not configured<br>  B2 = Exception - 1 indicates phone on hook<br>  B3 = Exception - 1 indicates analog line in use<br>  B4 = Exception - 1 indicates invalid digits to dial<br>  B5 = unused<br>  B6 = unused<br>  B7 = Overall Result - 0 indicates digits dialed on analog line,<br>          1 indicates request ignored |
| Reserved: | 1 byte, reserved for more result codes. |

* * * * *